(12) United States Patent
Tilley

(10) Patent No.: US 6,625,232 B1
(45) Date of Patent: Sep. 23, 2003

(54) SMART DC OFFSET CORRECTION LOOP

(75) Inventor: Keith A. Tilley, Round Rock, TX (US)

(73) Assignee: Motorola, Inc., Schaumbschaumburg, IL (US)

( * ) Notice: Subject to any disclaimer, the term of this patent is extended or adjusted under 35 U.S.C. 154(b) by 0 days.

(21) Appl. No.: 09/575,271

(22) Filed: May 22, 2000

(51) Int. Cl.⁷ .......................... H04L 25/06; H04L 25/10
(52) U.S. Cl. ................... 375/319; 375/318; 375/345
(58) Field of Search ......................... 375/319, 316, 375/317, 318, 243, 286, 345

(56) References Cited

U.S. PATENT DOCUMENTS

| | | | |
|---|---|---|---|
| 4,380,005 A | * 4/1983 | Debord et al. | 340/347 |
| 5,844,941 A | * 12/1998 | Mack et al. | 375/232 |
| 6,006,079 A | 12/1999 | Jaffee et al. | 455/310 |
| 6,411,098 B1 | * 6/2002 | Laletin | 324/436 |
| 6,529,237 B1 | * 3/2003 | Tsay et al. | 348/241 |

* cited by examiner

Primary Examiner—Mohammad H. Ghayour
(74) Attorney, Agent, or Firm—Randi L. Dalaney

(57) ABSTRACT

A DC offset correction method and apparatus. In a differential system, a DC offset correction loop includes a gain stage (104) having a differential input, a gain G and a differential output. A DAC circuit (130) provides a correction DC signal at the inputs to produce differential output signals $V_o'$ and $\overline{V_o}'$. A controller (120) corrects the DC offset by stepping the DAC circuit (130) to change the correction DC signal by an amount equal to approximately $(V_o' - \overline{V_o}')/G_x$, where $G_x$ is the gain G times the gain of the DAC expressed in volts per DAC step. A similar algorithm can be applied to single ended systems wherein a single ended $V_{OFFSET}$ is corrected by an amount equal to approximately $V_{OFFSET}/G_x$.

16 Claims, 2 Drawing Sheets

SMART DC OFFSET CORRECTION LOOP

TECHNICAL FIELD

This invention relates to techniques and apparatus for carrying out correction of DC offsets in electronic circuits. This invention is especially suitable for situations where rapid DC offset correction is desirable.

BACKGROUND OF THE INVENTION

Many electronic circuits require correction of DC offsets. Radio receivers, including direct conversion receivers and Zero IF (ZIF) receivers, along with radio transmitters as well as other types of electronic devices often require that a DC offset be corrected in order to permit proper operation of the device. When a DC offset is present, it can be amplified by direct coupled amplifiers to distort the signal being processed or even saturate the amplifiers' output at their supply limits, thus rendering the device inoperable. Therefore, DC offsets normally have to be corrected or compensated in some manner.

The requirements for such correction vary depending upon the application. For example, in certain applications for DC offset correction, there is a requirement that the speed of settling the DC offset correction loop be very fast. For example, in GSM radio receivers, the DC offset correction circuit must be settled to within ±30 mV maximum total error within 400 μS at the output of the baseband filter. This is a very stringent requirement which has proven challenging to meet. Even under circumstances where rapid correction is not required by a specification, it is desirable to minimize down time and optimize radio performance.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
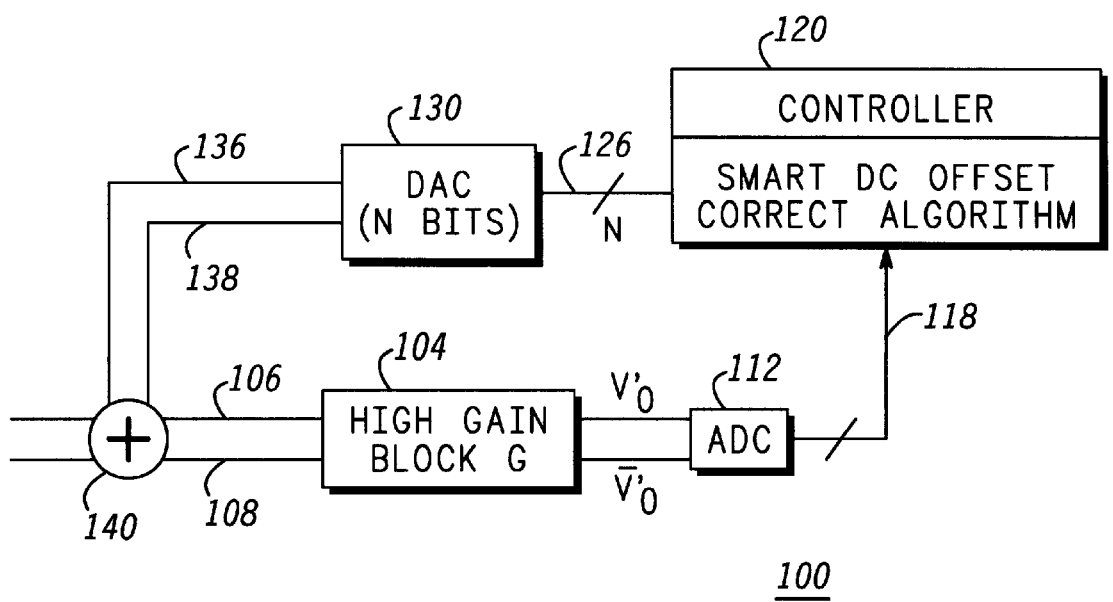
FIG. 1 is a block diagram of a DC offset correction loop using the smart correction algorithm of an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, a differential DC offset correction loop 100 is illustrated. As mentioned previously, the DC offset loop 100 can be a radio transmitter or receiver or any system susceptible to DC offsets. In the loop 100, a high gain block 104 receives input signals 106 and 108 that are amplified to produce signals $V_o'$ and $\overline{V_o}'$ which are differentially related in the present embodiment. When inputs to the DC loop are turned off (i.e., set to zero), then $V_o'$ and $\overline{V_o}'$ have DC components $V_o$ and $\overline{V_o}'$. The high gain block 104 exhibits forward gain referred to herein as G. Although G represents the gain of high gain block 104, those of ordinary skill in the art will understand that high gain block 104 can represent a model for multiple stages of amplification. Those having ordinary skill in the art will also recognize that in either a single ended embodiment or by way of a generic expression for the offset, $V_o$ and $\overline{V_o}$ can generically be replaced in the discussion to follow by a DC offset signal referred to herein as $V_{OFFSET}$, where $V_{OFFSET}$ is a DC offset voltage as referenced to an AC ground reference point, for the single ended case. For the differential case, $V_{OFFSET} = V_o - \overline{V_o}$. The output signals $V_o'$ and $\overline{V_o}'$ may be passed along for additional processing depending upon the exact nature of the circuit involved. In loop 100, an analog-to-digital converter (ADC) 112 converts $V_o'$ and $\overline{V_o}'$ to digital signals which are passed via bus 118 to a controller 120 that operates using the smart DC offset correction algorithm according to embodiments of the present invention.

The controller 120, as will become clear upon consideration of the following discussion, produces an output on bus 126 which directs a digital-to-analog converter (DAC) 130 to add a correction DC signal to input lines 106 and 108 via lines 136 and 138. This is represented schematically in loop 100 as an adding circuit 140. The controller 120, can be a microprocessor based controller programmed to carry out the process of FIG. 2, but this is not to be limiting since pure hardware embodiments are also possible.

Figure 2:
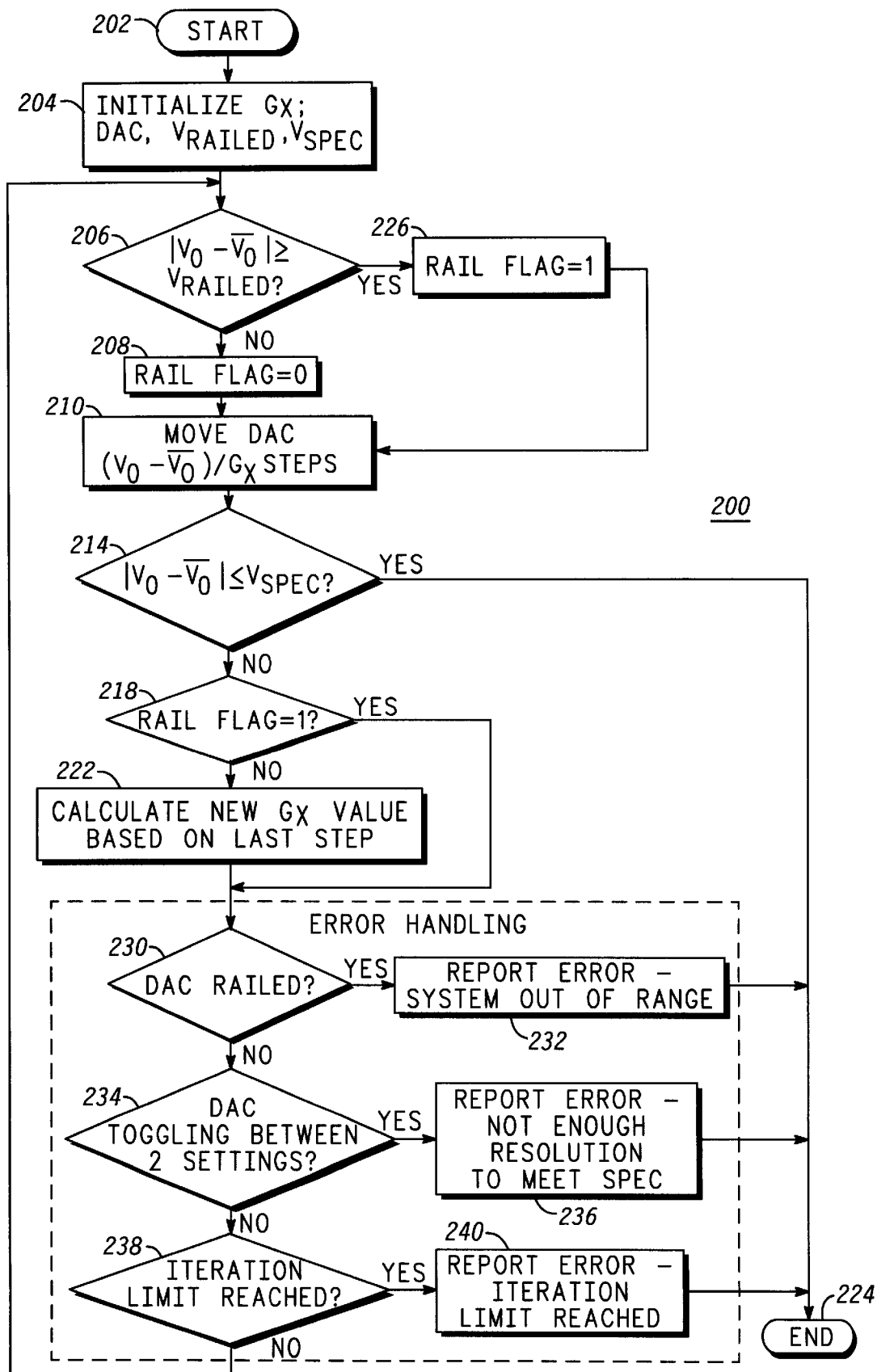
FIG. 2 is a flow chart of an embodiment of the smart correction algorithm of the present invention.

Referring now to FIG. 2, a flow chart describing the smart DC offset correction process of the present invention is shown generally as 200. The process starts at 202 after which variables and constants are initialized at 204 and any AC input signal to the loop 100 is shut off. In the case of a radio receiver, shutting off input to the loop 100 can be accomplished by disabling a receiver front end, turning down an AGC gain or other techniques. The gain through the forward path (i.e. gain G) times the gain of the DAC 130 is referred to hereinafter as $G_X$ (expressed in Volts/DAC step) and is approximately known. However, variations in circuit parameters and, for example, integrated circuit processing can cause a significant amount of variation in the gain of high gain block 104. Moreover, different DACs can have different step sizes.

Also initialized at 204 is the DAC output which provides a value which does not affect the input signals 106 and 108 and thus the output voltages $V_o$ and $\overline{V_o}$(or $V_{OFFSET}$). Two threshold values, $V_{RAILED}$ and $V_{SPEC}$, are also initialized at 204. At 206, the process first determines whether or not the output voltage is to be considered "railed" (i.e. pinned at the power supply limits). This is determined by comparing the difference between $V_o$ and $\overline{V_o}$(in absolute value) with the threshold $V_{RAILED}$. Assuming at 206 that the output is not to be considered railed ($|V_o - \overline{V_o}| < V_{RAILED}$ or $|<V_{OFFSET}| < V_{RAILED}$ in a single ended case), a rail flag is set to zero at 208. At 210, the value of $V_o$ minus $\overline{V_o}$ is divided by the gain $G_X$ and the output of the digital-to-analog converter 130 is controlled by controller 120 to move a number of steps which approximately produces the DC offset value divided by the gain. That is, the DAC 130 is moved a number of steps to produce an output which is approximately given by:

DAC steps≈$(V_o - \overline{V_o})/G_X$.

Or, for a single ended system:

DAC steps≈$(V_{OFFSET})/G_X$.

The direction in which the DAC is stepped (up or down) is determined by whether the high gain amplifier 104's output is positive or negative. The above relationships are shown as approximations due to the discrete number of steps in any DAC output. That is, the finite resolution of the DAC 130 limits the accuracy that the DAC 130 can move to approximate the relationship above. For example, if the DAC output can move in steps of 1.0 millivolts per step, it will be possible to approximate a move of 3.7 millivolts by four steps of the DAC representing a 4.0 millivolt move in the output of DAC 130.

Once this is accomplished, at 214 the absolute value of $V_o$ minus $\overline{V_0}$ is again examined to determine whether or not this value ($V_{OFFSET}$) is less than the DC offset specification threshold $V_{SPEC}$ (i.e. $|V_o-\overline{V_0}|<V_{SPEC}$ or $|V_{OFFSET}|<V_{SPEC}$ for the single ended case). If not, and the rail flag is not set equal to one at 218, then the value of the gain $G_X$ of high gain block 104 and DAC 130 is calculated based upon the adjusted value of $V_o$ minus $\overline{V_0}$ (or $V_{OFFSET}$ for the single ended or generic case). This refined value of gain $G_X$ can then be utilized to further refine the DC offset adjustment if need be. The refined value of gain $G_X$ is calculated by knowing the number of DAC steps that were taken by DAC 130 and by knowing the amount of change in $V_{OFFSET}$ (or $V_o$ minus $\overline{V_0}$) resulting from the change in the DAC 130. The change in DC offset divided by the number of DAC steps which produce the change in DC offset equals the new gain. That is:

$$G_X = (\Delta V_{OFFSET})/(\text{number of DAC steps})$$

Or:

$$G_X = \Delta(V_o - \overline{V_0})/(\text{number of DAC steps})$$

This gain $G_X$ is likely to be more accurate than the assumed gain which was initialized at 204, thus enabling the system to refine the estimate of DAC change to achieve a required DC offset correction in a subsequent iteration of process 200.

If at 214, the DC offset voltage was within the specification threshold $V_{SPEC}$, the correction value used to set DAC 130 is fixed and the correction process ends with control passing to 224. However, the present embodiment of the invention contemplates error handling in a number of ways. For example, if at 206 the DC offset voltage is considered to be railed then the railed flag is set to 1 at 226. Then, if the rail flag is 1 at 218 control passes from 218 to bypass 222 in favor of 230. If the DAC 130 is railed at 230 (i.e. at the DAC's minimum or maximum setting), then an error is generated at 232 before passing to 224. Similarly, 234 examines whether the DAC is toggling between two settings indicating that correction is not properly converging to a corrected DC offset. This is again handled by error reporting at 236 after which control passes to 224. At 238, the number of iterations of the process is examined and if an unacceptable number of iterations have occurred (e.g. greater than 5 iterations) without the DC offset converging, control passes to 240 where again an error report is generated followed by 224. If none of the error conditions 230, 234 or 238 are achieved, control passes back to 206 for a further iteration of the process to refine the DC offset correction. Other types of error handling, error conditions and actions to account for error conditions will occur to those having ordinary skill in the art.

In accordance with the process described above extremely fast settling times can be achieved with the DC offset correction converging to less than $V_{SPEC}$ in as little as one pass through process 200. By calculating the new gain $G_X$ the accuracy of the algorithm is enhanced and customized for the individual circuit at hand. Moreover, since this algorithm can be implemented in a digital signal processor, microprocessor or microcontroller operating under software control, the actual circuitry involved can be miniaturized to a great degree and refinements can be made to the algorithm without requiring expensive circuit changes.

In a variation of the above scenario, two digital-to-analog converters can be utilized in place of DAC 130 to provide coarse and fine adjustments as described in copending application Ser. No. 09/290,564. In another variation, the DC offset correction process can be performed without disabling the inputs, in which case voltages $V_o'$ and $\overline{V_0}'$ are used to generate the steps, given by DAC steps$\approx(V_o'-\overline{V_0}')/G_X$. This variation is usable when the AC components of the $V_o'$ and $\overline{V_0}'$ are small compared to the step sizes.

Those of ordinary skill in the art will recognize that the present invention has been described in terms of exemplary embodiments based upon use of a programmed processor forming a part of the DC offset correction loop. However, the invention should not be so limited, since the present invention could be implemented using hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, ASICS and/or dedicated hard wired logic may be used to construct alternative equivalent embodiments of the present invention. In general, it is advisable that the processing resources available within the device having DC offset correction be used to the extent possible. For example, in the case of a radio receiver or transmitter, often a control processor carries out many of the functions associated with control of the device. This control processor can be utilized to serve as the DC offset correction loop control processor.

Many other variations will also be evident to those of ordinary skill in the art. The embodiment disclosed can be embodied in a radio receiver, however, the method and apparatus is equally applicable to other systems requiring DC offset correction including radio transmitters.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for correcting a DC offset in a differential electronic circuit, comprising:

providing a gain stage having a differential input, a gain G and a differential output;

providing a Digital to Analog Converter (DAC);

defining a gain $G_X$ as gain G times a gain of the DAC;

examining differential output signals $V_o'$ and $\overline{V_0}'$; and correcting the DC offset by applying a correction DC signal from the DAC equal to approximately $(V_o'-\overline{V_0}')/G_X$ at the differential input.

2. A method in accordance with claim 1, wherein the method is carried out in one of a radio transmitter and a radio receiver.

3. A method in accordance with claim 1, further comprising providing an Analog to Digital Converter (ADC) which converts the signals $V_o$ and $\overline{V_o}$ into digital form for processing by a controller.

4. A method in accordance with claim 1, further comprising reporting an error in the event of any of the following conditions:

the DAC is set at its minimum or maximum setting;

the DAC is toggling between two values on successive iterations; and an iteration limit is reached.

5. A method in accordance with claim 1, further comprising determining if $|V_o'-\overline{V_o}'|$ is less than a specification value, and if $|V_o'-\overline{V_o}'|$ is less than a specification value then fixing the correction DC signal.

6. A method in accordance with claim 1, further comprising calculating a refined value for $G_X$ as:

$G_X$=(a change in $V_0'-\overline{V_0}'$)/(a number of DAC steps).

7. A method in accordance with claim 6, further comprising determining if $|V_o'-\overline{V_o}'|$ is less than a specification value, and if $|V_o'-\overline{V_o}'|$ is not less than a specification value then again correcting the DC offset by changing the correction DC signal by an amount equal to approximately $(V_o'-\overline{V_o}')$/(the refined value of $G_X$).

8. A method in accordance with claim 1, further comprising disabling an AC component of the differential input.

9. A method for correcting a DC offset in an electronic circuit, comprising:

providing a gain stage having an input, a gain G and an output;

providing a Digital to Analog Converter (DAC) which sets a correction DC signal;

defining a gain $G_X$ as gain G times a gain of the DAC;

determining an amount of DC offset signal $V_{OFFSET}$ at the output; and correcting the DC offset by applying the correction DC signal at the input by moving the DAC by an integer number of steps approximating $(V_{OFFSET})/G_X$.

10. A method in accordance with claim 9, wherein the method is carried out in one of a radio transmitter and a radio receiver.

11. A method in accordance with claim 9, further comprising reporting an error in the event of any of the following conditions:

the DAC is set at its minimum or maximum setting;

the DAC is toggling between two values on successive iterations; and an iteration limit is reached.

12. A method in accordance with claim 9, further comprising providing an Analog to Digital Converter (ADC) which converts $V_{OFFSET}$ into digital form for processing by a controller.

13. A method in accordance with claim 9, further comprising determining if $|V_{OFFSET}|$ is less than a specification value, and if $|V_{OFFSET}|$ is less than a specification value then fixing the correction DC signal.

14. A method in accordance with claim 9, further comprising calculating a refined value for $G_X$ as:

$G_X$=a change in $V_{OFFSET}$/(a number of DAC steps).

15. A method in accordance with claim 14, further comprising determining if $|V_{OFFSET}|$ is less than a specification value, and if $|V_{OFFSET}|$ is not less than a specification value then again correcting the DC offset by changing the correction DC signal by an amount equal to approximately $(V_{OFFSET})$/(the refined value of $G_X$).

16. A method in accordance with claim 9, further comprising disabling an AC component of the input.

* * * * *